A. LAURENCICH.
SPRING WHEEL.
APPLICATION FILED SEPT. 13, 1913.
1,081,844.
Patented Dec. 16, 1913.
4 SHEETS—SHEET 2.
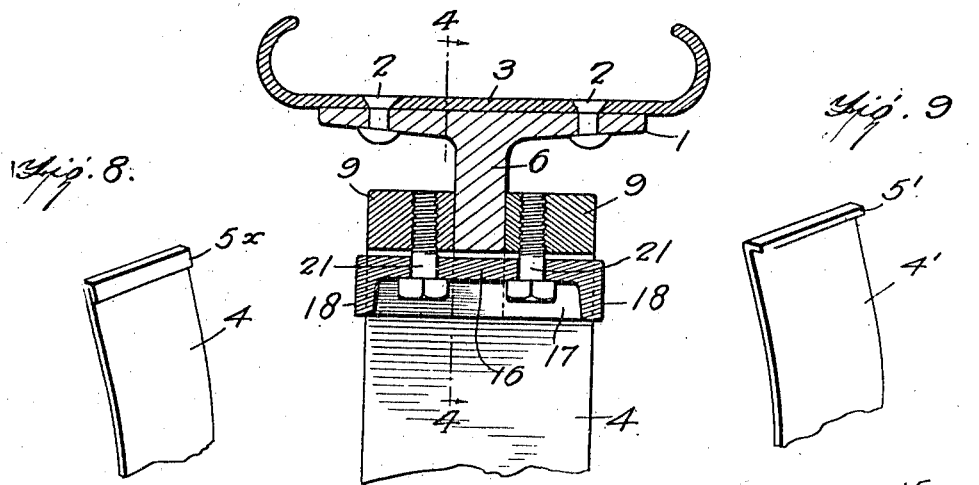
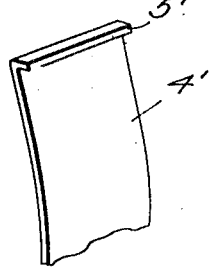
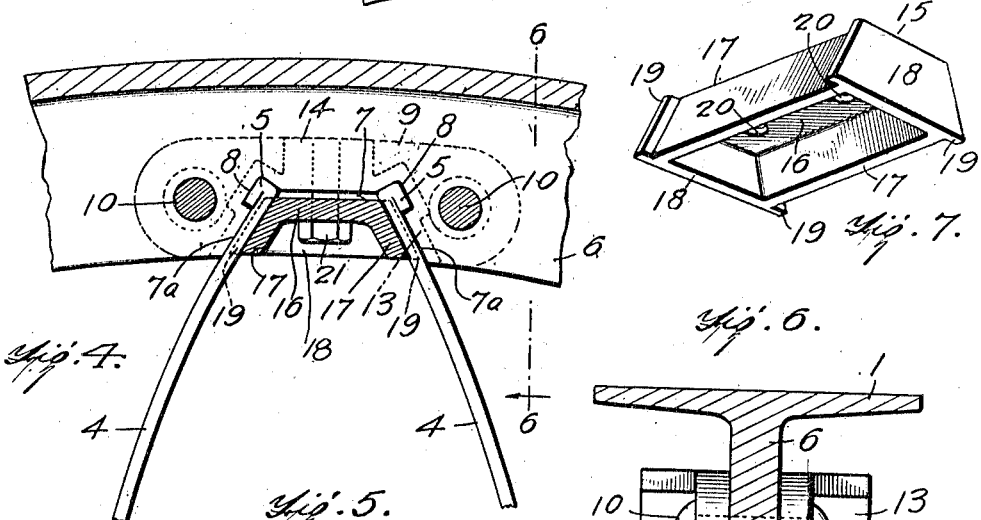
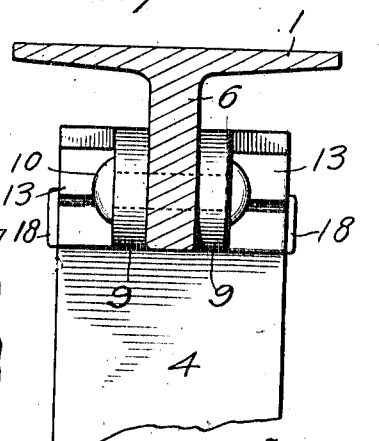
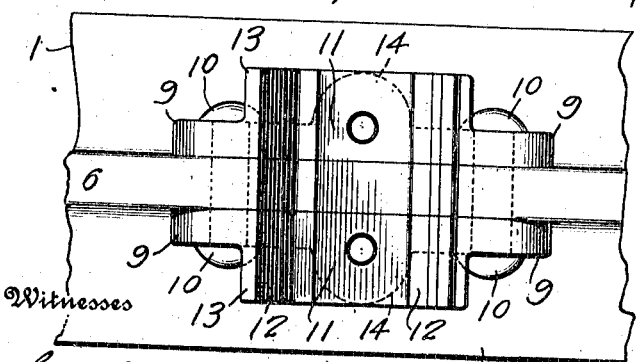
Witnesses
L. H. Schmidt.
John Scott
Inventor
ARTHUR LAURENCICH,
By
F. J. Brandenburg
Attorneys A. LAURENCICH.
SPRING WHEEL.
APPLICATION FILED SEPT. 13, 1913.
1,081,844.
Patented Dec. 16, 1913.
4 SHEETS—SHEET 3.
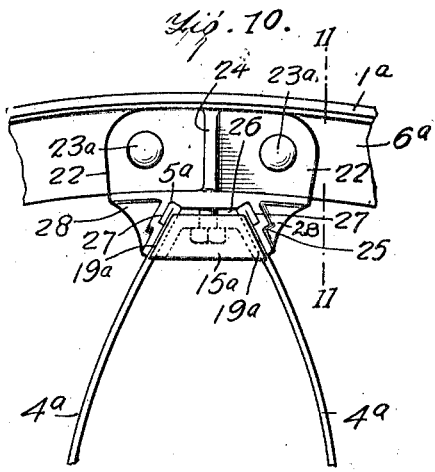
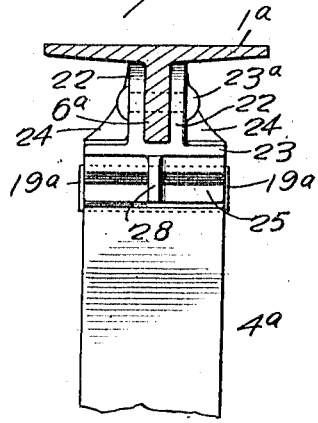
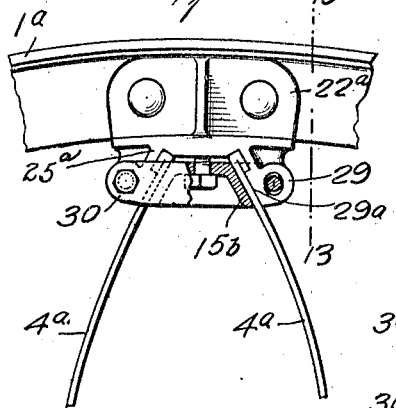
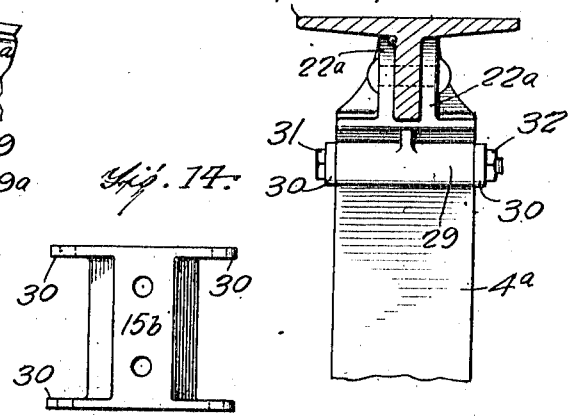
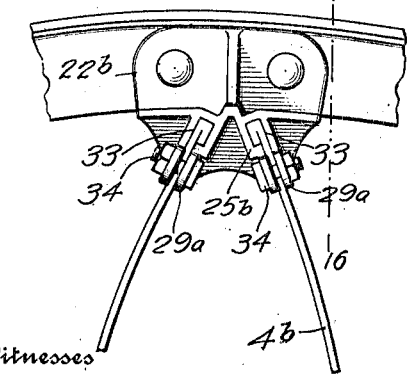
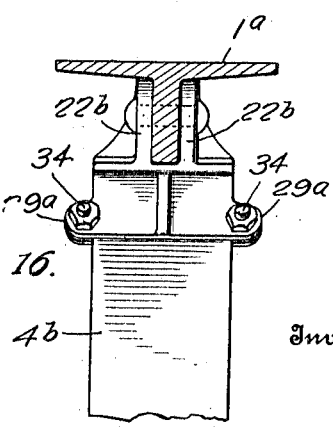
Witnesses
L. H. Schmidt.
John Scott
Inventor
ARTHUR LAURENCICH,
By E. F. J. W. Brandenburg
Attorneys

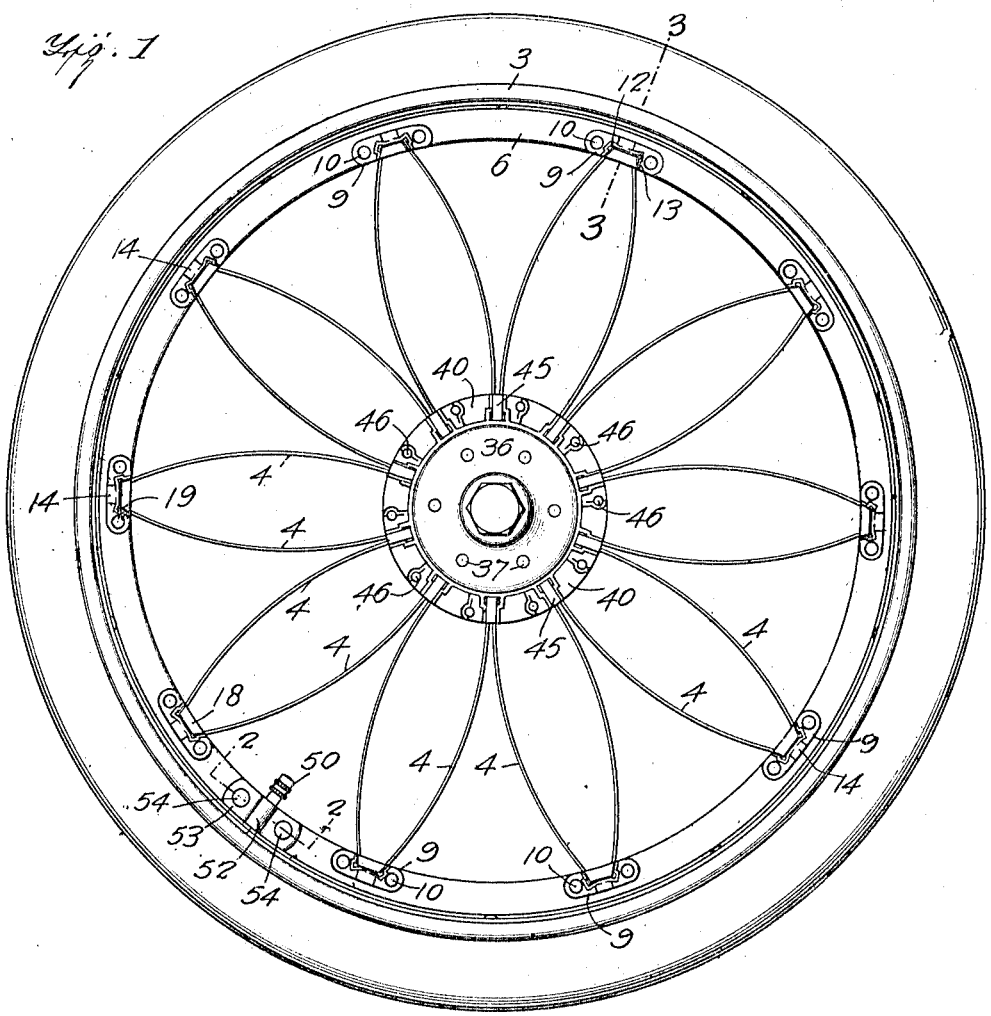
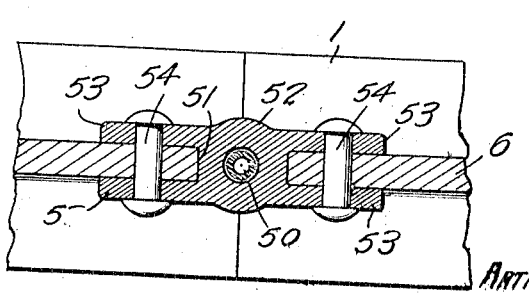

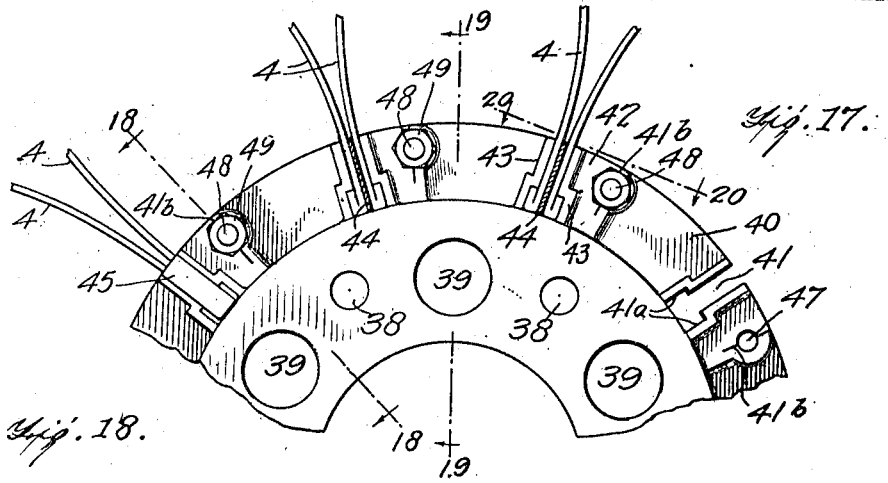
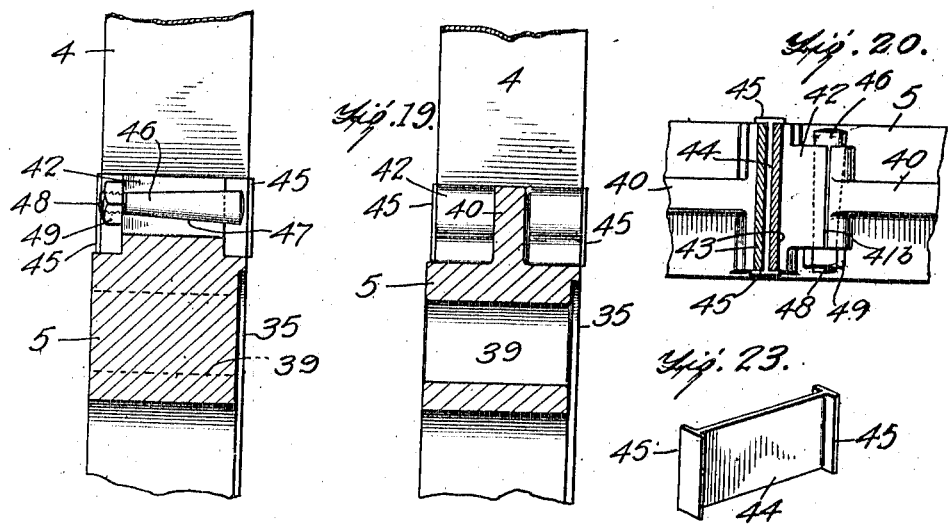
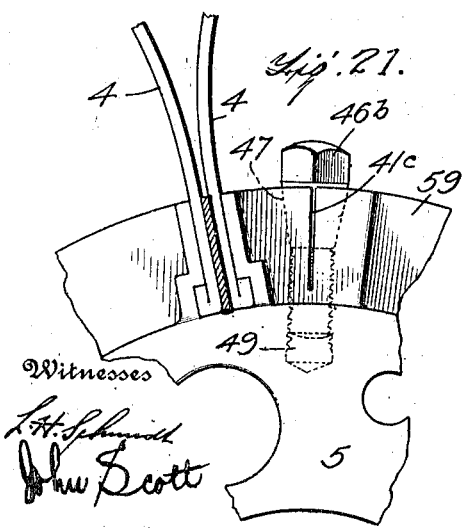
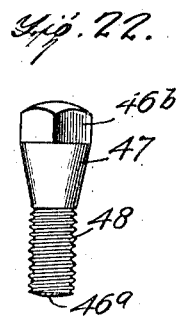
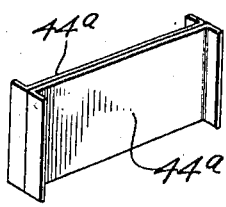

UNITED STATES PATENT OFFICE.

ARTHUR LAURENCICH, OF WASHINGTON, DISTRICT OF COLUMBIA, ASSIGNOR OF ONE-HALF TO WILLIAM A. KIMMEL, OF WASHINGTON, DISTRICT OF COLUMBIA.

SPRING-WHEEL.

1,081,844.  Specification of Letters Patent.  Patented Dec. 16, 1913.

Application filed September 13, 1913. Serial No. 789,678.

*To all whom it may concern:*

Be it known that I, ARTHUR LAURENCICH, a citizen of the United States, residing at Washington, in the District of Columbia, have invented new and useful Improvements in Spring-Wheels, of which the following is a specification.

The principal object, *inter alia*, of my invention is to provide a novel construction of spring wheel, especially designed for use on automobiles, with which it is possible to use a solid rubber, or cushion, tire and yet derive therefrom the great resiliency and ease of comfort in riding, which characterize a wheel equipped with an ordinary pneumatic tire. A pneumatic tire, while desirable on account of its resiliency, is objectionable because of its liability to puncture and because of its expense.

It is, therefore, one of the primary objects of my invention to provide a novel construction of spring wheel, by the use of which the necessity for a pneumatic tire is avoided, and which, at the same time, will retain all the advantages of a pneumatic tire, without its objectionable features.

It is also an important object of my invention to provide a wheel, of the character noted, which, by reason of its relative simplicity of structure, can be manufactured and sold at such a figure as successfully to compete with other wheels now on the market.

It is a further desideratum with me to provide a spring wheel which will be exceedingly durable in use, and which will not be likely to get out of order.

An auxiliary object is to provide a novel and simple and efficient means for retaining the springs in position against possibility of creeping or working loose.

A further object is to provide a spring wheel, provided with leaf springs, in which the leaf-springs are imperforate, that is, are assembled with the wheel without the use of bolts passing through the springs. With the usual construction of leaf springs in wheels, the leaf springs are punctured or cut in some manner in assembling them with the wheel, which weakens the springs at the point of puncture or cut.

With these objects in view, the invention comprehends a structure in which a novel form of spring-supporting members is carried by the wheel-rim, and in which a novel form of wedge means coöperates with the spring-supporting members to retain one end of the springs in position.

Moreover, the invention comprehends a structure in which a novel form of wheel-hub is provided, coöperating with a novel form of wedge means, to retain the other end of the springs in position.

The invention also comprehends a structure in which a peculiar and novel form of locking-key is used, which coöperates with the wheel-hub in retaining the springs in position at their point of engagement with the hub.

The invention, finally, comprehends certain felicitous and advantageous details of construction, which go to make up the ultimate perfection of the whole device.

The invention is graphically visualized in the accompanying drawings, in which like reference-characters denote corresponding parts throughout the several views. In these drawings, I have exhibited, as illustrations, several desirable forms of embodiment of my invention capable of carrying out the underlying principles thereof. A brief description of the different figures of the drawings follows:

Figure 1 is a side elevational view of a spring wheel equipped with my improvements; Fig. 2 is a fragmentary view, in horizontal cross section, taken on the line 2—2, Fig. 1; Fig. 3 is a fragmentary transverse sectional view, taken on the line 3—3, Fig. 1; Fig. 4 is a sectional view, taken on the line 4—4, Fig. 3; Fig. 5 is a bottom plan view of the parts shown in Fig. 4, the wedge-member (shown in Fig. 4) being omitted, for the purpose of clearness of illustration of the remaining parts; Fig. 6 is a section taken on the line 6—6, Fig. 4; Fig. 7 is a perspective detail view of the form of wedge used with the device shown in the preceding figures; Figs. 8 and 9 are fragmentary detail views of two forms of springs which may be used; Fig. 10 is a fragmentary detail view of a slightly modified form of spring-supporting member; Fig. 11 is a sectional view, taken on the line 11—11, Fig. 10; Fig. 12 is a fragmentary detail view of a second, slightly-modified form of spring-supporting member and of a wedge coöperating therewith; Fig. 13 is a sectional view, taken on the line 13—13, Fig. 12; Fig. 14 is a detail view, in top plan, of the form of wedge used in connection with the device shown in Figs. 12 and 13; Fig. 15 is a fragmentary detail view of a third, slightly-modified form of spring-supporting member; Fig. 16 is a sectional view, taken on the line 16—16, Fig. 15; Fig. 17 is a fragmentary detail view of my peculiar form of hub and of my peculiar form of wedge-means coöperating therewith; Figs. 18, 19 and 20 are sectional views, taken, respectively, on the lines 18—18, 19—19, and 20—20, Fig. 17; Fig. 21 is a fragmentary detail view of a slightly-modified form of hub and of a wedge-member coöperating therewith; Fig. 22 is a detail view of the form of wedge shown in Fig. 21; and Figs. 23 and 24 are perspective detail views of a single-piece locking-key and a "split" or two-section locking-key, respectively.

Referring, now, in detail to the drawings: 1 designates the wheel-rim, which, as shown, may be T-shaped in transverse section. To this rim is secured, in any suitable manner, as by rivets 2, the tire-holder 3, which, forming no part of my invention, may be of any suitable or desired construction.

4 designates the springs of my invention, which, as shown, are disposed intermediate the rim 1 and the wheel-hub 5 (of peculiar formation, later to be described). These springs are bow-shaped, leaf springs, as shown, and are constructed of suitable material, such as steel, so as to derive from their use the maximum of strength and durability. They are, in width and in number, sufficient to meet the requirements of the particular wheel in which they are to be installed, and the use to which the particular wheel is intended to be put. The springs may be formed, in respect to their terminals, either as shown in Fig. 8, or as shown in Fig. 9. That is to say, both ends or terminals, of each spring, may be transversely bent and doubled or folded down upon the spring, as shown at 5×, in Fig. 8; or, as shown in Fig. 9, each spring 4' may, at both ends, be simply bent transversely, as shown at 5', without being doubled or folded down upon the spring. A spring equipped with the bent terminals shown in Fig. 9 is, perhaps, preferable, from the standpoint of ease and simplicity of manufacture.

My invention contemplates peculiar, novel, simple, and efficacious means for holding the springs in place, at both their terminals, and several forms of advantageous means are exemplified in the drawings, and will now be described, as follows: Referring, first, to Figs. 1, 3, 4, 5 and 6: The centrally-disposed, right-angled flange 6 of the rim 1 is provided, at its free extremity, along the edge thereof, with a plurality of symmetrically-arranged, cut-away portions 7 (see Fig. 4), one thereof being provided for each pair of springs 4. The construction of these cut-away portions is peculiar. The side walls of each opening, or cut-away portion, are convergingly-inclined upward from the free edge of the flange 6, as at 7ª (see Fig. 4); and the inner end of each cut-away portion is offset, on opposite sides thereof, as shown at 8, 8, forming a seat or pocket for the bent terminals 5× of the springs 4, and preventing accidental removal thereof by a force exerted thereon in the direction of the length thereof. As shown in Fig. 4, the springs 4, 4, toward one end thereof, bear against the sides of the openings or cut-away portions 7.

On both sides of the flange 6 are disposed spring-supporting members 9, which are arranged in pairs, each pair being disposed adjacent one of the openings or cut-away portions 7. Each of said members consists of an elongated plate suitably secured, as by rivets 10, to the flange 6, and having a cut-away or recessed portion 11 extending from one longitudinal edge of the plate, at a point intermediate the length thereof, so as to accommodate the springs 4. This cut-away portion is provided with sloping or inclined, converging sides 12, corresponding with the inclined sides 7ª of the openings or cut-away portions 7; and, when the plates 9 are in proper position on the flange 6, the recessed portion 11 registers with the recessed portion 7. Each recessed portion 11 has, at the inner end thereof, an offset 12' (Fig. 1), forming a seat or pocket for the reception of the bent end 5× of the spring 4. The plate or member 9 is provided, along the edges of the recessed portion 11, with a right-angled flange 13 (Figs. 1, 4, 5 and 6), forming a bearing for the springs 4, toward one end thereof. Each plate or member 9 is also provided, intermediate the length thereof, with a boss 14 (Figs. 1 and 4).

My invention contemplates the provision of suitable means for retaining the springs in position, when seated in the supporting-members 9, and a convenient and efficient form of these means is shown in the drawings and will now be described. Said means consist, preferably, of a wedge-member, designated, generally, in Fig. 7, by the reference number 15; and it comprises a top 16, two longitudinal, inclined, and converging sides 17, 17, and two ends 18, 18, which latter are extended beyond the sides 17, 17, so as to form lips 19, 19, bearing against the sides of the springs 4, to hold them from sidewise movement. The wedge-member 15 is also provided, in its top 16, with bolt-openings 20, 20. In use, the wedge-member 15 is forced up between a pair of springs 4, 4 (as shown in Figs. 1 and 4), which jams said pair of springs tightly against the spring-supporting members 9, 9. The wedge is then locked in position in any suitable manner, as by screws 21, 21 passing through the openings 20, 20, into the spring-supporting-members 9, 9.

In Figs. 10 and 11 is shown a slightly-different form of spring-supporting member. In this instance, each of said members consists of two, parallel, spaced plates 22, 22, formed integral, as by casting, with an expanded base 23. The central flange 6ª of the rim 1ª is disposed between the plates 22, 22, and the latter are suitably secured to the former, as by rivets 23ª, 23ª passing therethrough. Each plate 22 may be provided with a transversely-extending strengthening-rib or flange 24. The base 23 carries a depending skirt 25, having a central, cut-away portion 26 extending upward from the lower edge thereof, and having inclined, converging side-walls, constituting bearings for the springs 4ª, 4ª. The cut-away portion 26 of each skirt 25 is provided, at its inner end, with oppositely-disposed offsets 27, constituting seats for the bent terminals 5ª of the springs 4ª. The skirt 25 may be provided with strengthening ribs or flanges 28, 28. A wedge-member 15ª, having lips 19ª, 19ª, is provided, and is identical with and serves the same purpose as the wedge member 15 of the preceding figures of the drawings, and, therefore, needs no detailed description.

Figs. 12, 13 and 14 show a slightly-modified form of spring-supporting member 22ª and wedge-member 15ᵇ. The spring-supporting member 22ª is substantially similar to the spring-supporting member of Figs. 10 and 11, excepting that the skirt 25ª is provided, toward its lower end, with oppositely-disposed, apertured ears 29. The wedge-member 15ᵇ is also substantially similar to the wedge-member of the preceding figures of the drawings, excepting that, instead of the lips 19ª (see, for instance, Figs. 10 and 11), it is provided, at both ends, with oppositely-disposed pairs of apertured ears 30. The wedge-member is secured in position by suitable means, such as bolts 31 passing through the apertured ears 29 and 30, and carrying nuts 32.

Figs. 15 and 16 show a slightly-modified form of spring-supporting member 22ᵇ. In this instance, the wedge used in the device of the preceding figures of the drawings is dispensed with. Each member 22ᵇ has a skirt 25ᵇ, provided with two pairs of oppositely-disposed ears 29ª, and with two convergingly-inclined slots 33, extending from the bottom thereof upward. The springs 4ᵇ are slipped into the slots 33, and are held against accidental displacement by bolts 34 passing through the apertured ears 29ª, 29ª, on each side of said springs.

Several forms of means for holding in position one end of the bowed leaf-springs have now been described. There remains to be described the particular form of means for holding in position the opposite ends of said springs. Referring, first, to Figs. 17, 18, 19 and 20: The hub 5 is preferably recessed on one face thereof, as shown at 35, in which fits a central apertured disk 36 (Fig. 1) secured to the hub in any suitable manner, as by bolts 37 passing through bolt-apertures 38 in the hub. The hub is also provided with apertures 39 for purpose of lightness. The hub carries, centrally of the width thereof, a longitudinally-extending, peripheral flange 40. The hub is, in a plurality of places, split or cut the entire width thereof, as shown at 41; the side walls of said cut-away portions being offset, or bent, at their inner ends, as shown at 41ª, forming seats or pockets for the bent ends 5ˣ of the springs 4, and thus preventing accidental removal thereof by a force exerted thereon in the direction of the length thereof. Near each slotted or recessed portion 41, the flange 40 is cut or slit, as shown at 41ᵇ, transversely thereof, said slit extending from the periphery of the flange part way, only, of the width thereof, as shown in Fig. 17. The hub 5 is provided, adjoining and at the point of the slit 41ᵇ, with a transversely-extending boss 42 (see Figs. 17 and 20), the split 41ᵇ extending longitudinally thereof, part way therethrough. The flange 40 also carries, on each side thereof, right-angled, transversely-extending flanges 43, said flanges extending along the edges of the cut-away portions 41, and constituting bearings for the ends of the springs 4. The ends of the springs 4 are, as shown in Figs. 1 and 17, passed into the cut-away portions 41.

A locking-key 44 may, if desired, be used; but this is not essential and may be dispensed with. This locking-key is a plate 44 (see Fig. 23), which is thrust down into the cut-away portion 41, between two adjacent springs 4 (see Figs. 1, 17, and 20). The key is provided, at each end, with a double flange 45, which bears against the sides of two adjacent springs 4 (as shown in Figs. 1, 18 and 20), thus preventing sidewise movement thereof. A wedge-key 46 (formed as a tapering roller) projects horizontally through a tapering bore 47 in the boss 42, and is provided with a screw-threaded end 48, on which is screwed a nut 49. Obviously, by tightening up the nut, the wedge-roller 46 is moved to cause the bifurcated boss 42 to spread, and thus jam tightly against the springs 4, preventing accidental withdrawal thereof.

As shown in Fig. 24, the locking-key 44, instead of being in one piece, as shown in Fig. 23, may be a "split" key, i. e., a key formed in two similar sections 44ª, 44ª.

Referring, now, to Figs. 21 and 22, the construction here is the same as in Fig. 17 et seq., excepting that, instead of a horizontally-disposed wedge-roller-key (as shown in Fig. 17 et seq., a vertically-disposed wedge-key (designated, generally, by 46ª in Fig. 22) is provided. This particular form of key is furnished with a head 46ᵇ adapted for engagement by a wrench, a tapering, smooth shank 47, and a screw-threaded portion 48. As disclosed in Fig. 21, the wedge is seen passing vertically down into the split portion 41ᶜ of the flange 59, the screw-threaded portion 48 being screwed into a threaded socket 49 in the hub 5. The function of this key 46ª is the same as the key 46 of the device of Fig. 17 et seq.

Fig. 2 shows a means for carrying the air-inflating tube 50, without weakening the flange 6, or the rim 1. The flange 6 is split or cut-away, as shown at 51, and in this cut-away portion is disposed the body portion of a tube-carrying member 52, provided, at each end, with a pair of arms 53, engaging between them the flange 6. Rivets 54, or the like, pass through the arms 53 and the flange 6, thus securing the member 52 to the flange 6.

I am aware that many modifications in detail may be resorted to; but all such as come within the scope of the appended claims are comprehended by my invention, and constitute no departure from the spirit thereof.

Having thus fully described my invention, what I claim as new and desire to secure by Letters Patent of the United States is:

1. In a spring wheel, the combination, with a rim and a hub, of springs interposed between said rim and hub, said hub having cut-away portions into which said springs project and being, also, split at a plurality of points around its perimeter, a locking-key disposed in each of said cut-away portions, between two adjacent springs, and provided with means engaging said springs and preventing sidewise movement thereof, and wedging means carried by said hub at said split portions thereof and movable to widen said slits to clamp the springs against movement.

2. In a spring wheel, the combination, with a rim and a hub, of springs interposed between said rim and hub, said hub having cut-away portions into which said springs project and being, also, split at a plurality of points around its perimeter, a locking-key disposed in each of said cut-away portions, between two adjacent springs, and provided with flanges at both ends engaging said springs and preventing sidewise movement thereof, and wedging means carried by said hub at said split portions thereof and movable to widen said slits to clamp the springs against movement.

3. In a spring wheel, the combination, with a rim and a hub, of springs interposed between said rim and hub, said hub having cut-away portions into which said springs project and being, also, split at a plurality of points around its perimeter, a locking-key, comprising a plate, disposed in each of said cut-away portions, between two adjacent springs, and provided with means engaging said springs and preventing sidewise movement thereof.

In testimony whereof, I have hereunto set my hand in presence of two subscribing witnesses.

ARTHUR LAURENCICH.

Witnesses:
E. T. BRANDENBURG,
ANDREW I. HICKEY.

Copies of this patent may be obtained for five cents each, by addressing the "Commissioner of Patents, Washington, D. C."